United States Patent [19]

Parekh

[11] Patent Number: 5,207,850

[45] Date of Patent: May 4, 1993

[54] PROCESS FOR MAKING THERMOPLASTIC COMPOSITES WITH CYCLICS OLIGOMERS AND COMPOSITES MADE THEREBY

[75] Inventor: Shashi L. Parekh, Pittsfield, Mass.

[73] Assignee: General Electric Company, Pittsfield, Mass.

[21] Appl. No.: 553,925

[22] Filed: Jul. 17, 1990

[51] Int. Cl.⁵ ............................................. B32B 31/12
[52] U.S. Cl. ................................... 156/166; 156/180; 156/441; 264/136; 264/174
[58] Field of Search ........................ 156/166, 180, 441; 264/136, 137, 174

[56] References Cited

U.S. PATENT DOCUMENTS

| | | | |
|---|---|---|---|
| 3,993,726 | 11/1976 | Moyer | 264/174 |
| 4,046,836 | 9/1977 | Adelmann et al. | 525/462 |
| 4,058,581 | 11/1977 | Park | 264/136 |
| 4,609,515 | 9/1986 | Smyth | 264/136 |
| 4,644,053 | 2/1987 | Brunelle et al. | 528/370 |
| 4,680,224 | 7/1987 | O'Connor | 428/294 |
| 4,714,737 | 12/1987 | Patterson | 524/611 |
| 4,728,700 | 3/1988 | Patterson | 524/611 |
| 4,786,710 | 11/1988 | Rosenquist et al. | 528/370 |
| 4,792,481 | 12/1988 | O'Connor et al. | 427/178 |
| 4,820,366 | 4/1989 | Beever et al. | 156/180 |
| 4,864,964 | 9/1989 | Hilakos | 156/180 |
| 4,883,552 | 11/1989 | O'Connor et al. | 156/180 |
| 4,883,625 | 11/1989 | Glemet et al. | 264/136 |
| 4,891,179 | 1/1990 | Peacock et al. | 264/258 |
| 4,892,600 | 1/1990 | Beever | 156/166 |
| 4,907,527 | 3/1990 | Hilakos et al. | 118/67 |
| 5,006,373 | 4/1991 | Woodmansee et al. | 427/422 |

Primary Examiner—Michael W. Ball
Assistant Examiner—Steven D. Maki

[57] ABSTRACT

A process for preparing shaped thermoplastic composite articles of continuous fibrous strand material in a polymeric resin matrix. The shaped composite articles are prepared by a pultrusion process involving contacting the strands with cyclic oligomers, for example cyclic polycarbonate oligomers, and then polymerizing the oligomers into high molecular weight polymer to produce a composite. The process provides for low melt viscosity impregnation of the strands with cyclic oligomers prior to formation of the high molecular weight resin matrix.

3 Claims, 2 Drawing Sheets

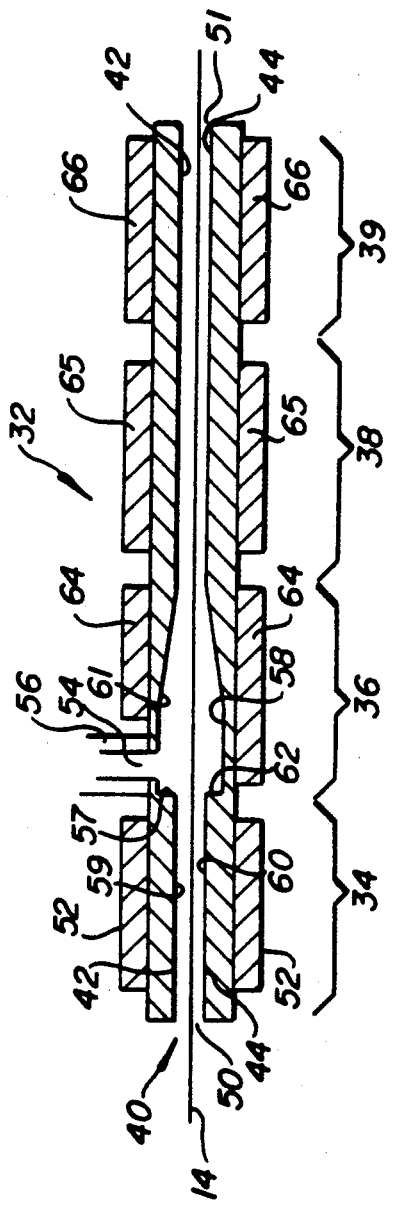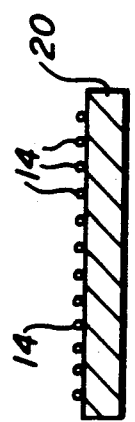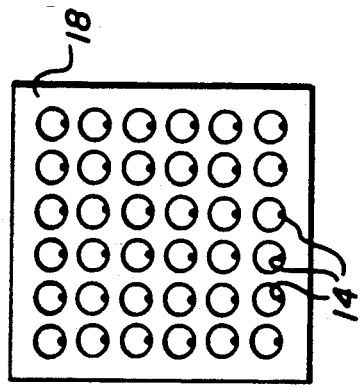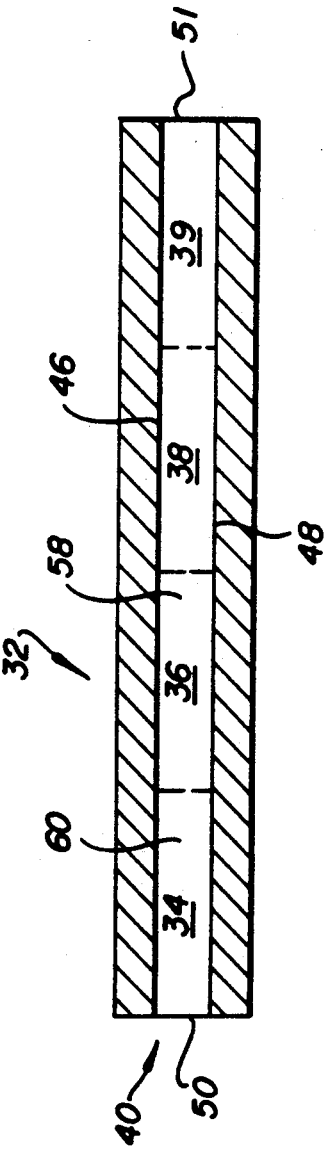

PROCESS FOR MAKING THERMOPLASTIC COMPOSITES WITH CYCLICS OLIGOMERS AND COMPOSITES MADE THEREBY

BACKGROUND OF THE INVENTION

1. Field of the Invention

The present invention relates to polymeric composites and methods for making the same, and more particularly relates to thermoplastic composites made from cyclic oligomers and pultrusion processes for making thermoplastic composites made from cyclic oligomers.

2. Description of Related Art

Pultrusion processes for thermoset resins are well known wherein the thermosetting materials are wetted out on the glass strands and reacted to make a thermoset composite. Composites made by impregnating fibers with cyclic carbonate oligomers are set out in Rosenquist et al., U.S. Pat. No. 4,786,710. Pultrusion processes for thermoplastics are not generally well known, however, a pultrusion process for making reinforced plastic objects having a thermoplastic poly(arylene sulfide) matrix is disclosed by O'Connor, U.S. Pat. No. 4,680,224, which teaches pultruding glass fiber strands rovings impregnated with poly(phenylene sulfide) powder. Prior pultrusion processes have, however, been generally unsuitable for making aromatic polycarbonate resin composites because polycarbonate resins, as well as many other thermoplastics, (i) are not sufficiently brittle to easily permit grinding into very fine powder for effective powder impregnation of the glass strands and (ii) are of too high a melt viscosity for effective melt impregnation and wet out of the glass strands. However, U.S. Pat. No. 4,892,600 lists polycarbonate, among other polymers, as a thermoplastic that could be used in the pultrusion process described therein.

Accordingly, one object of the present invention is to provide a pultrusion process for making reinforced thermoplastic composites.

Another object of the present invention is to provide a pultrusion process for making thermoplastic composites containing substantially unidirectional strands in an aromatic polycarbonate resin matrix.

SUMMARY OF THE INVENTION

The present invention involves a pultrusion process for making reinforced thermoplastic articles. The process comprises contacting at least one continuous reinforcing strand with molten cyclic oligomers, polymerizing the oligomers at an elevated temperature in the presence of catalyst to make a molten resin matrix, and allowing the resin matrix to cool under pressure to make the final reinforced thermoplastic composite.

BRIEF DESCRIPTION OF THE DRAWINGS

FIG. 2 is a vertical cross sectional view of the pultrusion die of FIG. 1.

FIG. 3 is a horizontal cross sectional view of the pultrusion die of FIG. 1.

FIG. 4 is a front horizontal cross sectional view of the strands coming over bar 20.

FIG. 5 is a front view of a strand guide.

DETAILED DESCRIPTION OF THE INVENTION

Figure 1:
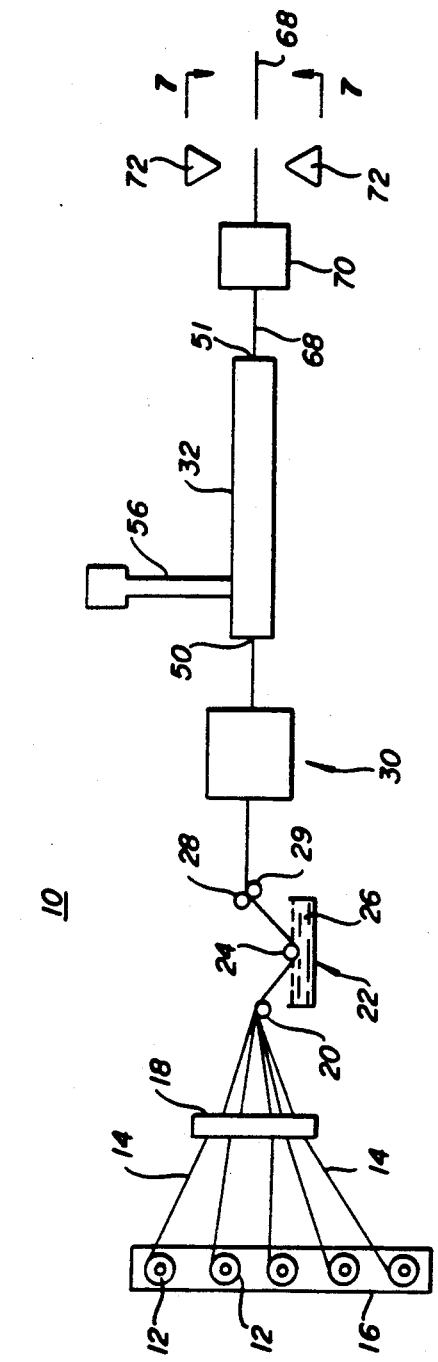
FIG. 1 is a side elevational schematic view of an apparatus for practicing the process of the present invention.

Cyclic polycarbonate oligomers are disclosed in Brunelle, et. al., U.S. pat. No. 4,644,053; Brunelle, et. al., U.S. Pat. No. 4,696,998; Brunelle, et. al., U.S. Pat. No. 4,736,016; Shannon, et. al., U.S. Pat. No. 4,767,840; Silva, U.S. Pat. No. 4,616,077; Pyles, et. al., U.S. Pat. No. 4,686,046; Howery, et. al., U.S. Pat. No. 4,686,277; Boden, U.S. Pat. No. 4,722,994; Brunelle, et. al., U.S. Pat. No. 4,727,134; Brunelle, et. al., U.S. Pat. No. 4,775,741; and Silva, U.S. Pat. No. 4,814,429; all of which are incorporated herein by reference. Other references disclosing cyclic polycarbonate oligomers include U.S. Pat. Nos. 3,155,683; 3,386,954; 3,274,214; and 3,422,119; all of which are incorporated herein by reference.

The cyclic oligomer preferably comprises structural units having the formula:

$$-Y^1-R^1-Y^1-\overset{O}{\underset{\|}{C}}- \qquad (I)$$

wherein each $R^1$ is independently a divalent aliphatic, alicyclic or aromatic radical and each $Y^1$ is independently oxygen or sulfur.

As will be apparent from the above, the cyclic oligomers useful in this invention may contain organic carbonate, thiolcarbonate and/or dithiolcarbonate units. The various $R^1$ values therein may be different but are usually the same, and may be aliphatic, alicyclic, aromatic or mixed; those which are aliphatic or alicyclic generally contain up to about 8 carbon atoms. Suitable $R^1$ values includes ethylene, propylene, trimethylene, tetramethylene, hexamethylene, dodecamethylene, 1,4-(2-butenylene), 1,10-(2-ethyldecylene), 1,3-cyclopentylene, 1,3-cyclohexylene, 1,4-cyclohexylene, m-phenylene, p-phenylene, 4,4'-biphenylene, 2,2-bis(4-phenylene)propane, benzene-1,4-dimethylene (which is a vinylog of the ethylene radical and has similar properties) and similar radicals such as those which correspond to the dihydroxy compounds disclosed by name or formula (generic or specific) in U.S. Pat. No. 4,217,438, the disclosure of which is incorporated by reference herein. Also included are radicals containing non-hydrocarbon moieties. These may be substituents such as chloro, nitro, alkoxy and the like, and also linking radicals such as thio, sulfoxy, sulfone, ester, amide, ether and carbonyl. Most often, however, all $R^1$ radicals are hydrocarbon radicals.

Preferably at least about 60% and more preferably at least about 80% of the total number of $R^1$ values in the cyclic oligomers, and most desirably all of said $R^1$ values, are aromatic. The aromatic $R^1$ radicals preferably have the formula:

$$-A^1-Y^2-A^2- \qquad (II)$$

wherein each of $A^1$ and $A^2$ is a single-ring divalent aromatic radical and $Y^2$ is a bridging radical in which one or two atoms separate $A^1$ from $A^2$. The free valence bonds in formula II are usually in the meta or para positions of $A^1$ and $A^2$ in relation to $Y^2$. Such $R^1$ values may be considered as being derived from bisphenols of the formula $HO-A^1-Y^2-A^2-OH$. Frequent reference to bisphenols will be made hereinafter, but it should be understood that $R^1$ values derived from suitable compounds other than bisphenols may be employed as appropriate.

In formula II, the $A^1$ and $A^2$ values may be unsubstituted phenylene or substituted derivatives thereof, illustrative substituents (one or more) being alkyl, halo (especially chloro and/or bromo), nitro, alkoxy and the like. Unsubstituted phenylene radicals are preferred. Both $A^1$ and $A^2$ are preferably p-phenylene, although both may be o- or m-phenylene or one o- or m-phenylene and the other p-phenylene.

The bridging radical, $Y^2$, is one is which one or two atoms, preferably one, separate $A^1$ and $A^2$. It is most often a hydrocarbon radical and particularly a saturated radical such as methylene, cyclohexylmethylene, 2-(2.2.1)-cycloheptylmethylene, ethylene, isopropylidene, neopentylidene, cyclohexylidene, cyclopentadecylidene, cyclododecylidene or adamantylidene, especially a gem-alkylene (alkylidene) radical. Also included, however, are unsaturated radicals and radicals which are entirely or partially composed or atoms other than carbon and hydrogen. Examples of such radicals are 2,2-dichloroethylidene, carbonyl, thio and sulfone. For reasons of availability and particular suitability for the purposes of this invention, the preferred radical of formula II is the 2,2-bis(4-phenylene)propane radical, which is derived from bisphenol A and in which $Y^2$ is isopropylidene and $A^1$ and $A^2$ are each p-phenylene.

As noted, each $Y^1$ value is independently oxygen or sulfur. Most often, all $Y^1$ values are oxygen and the corresponding compositions are cyclic polycarbonate oligomers.

The cyclic oligomers have degrees of polymerization from 2 to about 30. Cyclic oligomer mixtures may be used, including those in which the various molecular species have degrees of polymerization up to about 20, with a major proportion being up to about 12 and a still larger proportion up to about 15. Such mixtures have relatively low melting points as compared to single compounds such as the corresponding cyclic trimer. The cyclic oligomer mixtures are generally liquid at temperatures above 300° C., most often at temperatures above 225° C. and frequently above 200° C.

The cyclic oligomer mixtures should generally contain low proportions of linear oligomers. In general, no more than about 10% by weight, and most often no more than about 5%, of such linear oligomers should be present. The mixtures also usually contain low percentages (frequently less than 30% and preferably no higher than about 20%) of polymers (linear or cyclic) having a degree of polymerization greater than about 30. These properties, coupled with the relatively low melting points and viscosities of the cyclic oligomer mixtures, contribute to their utility as resin precursors, especially for high molecular weight resins.

Although any suitable process may be employed for making the cyclic oligomers, the following is a process for preparing cyclic oligomer mixtures. Suitable cyclic oligomer mixtures may be prepared by a condensation reaction involving at least one compound selected from the group consisting of bishaloformates and thiol analogs thereof, said compounds having the formula:

$$R^1(Y^1COX)_2 \qquad III$$

or a mixture thereof with at least one bis-(active hydrogen) compound having the formula:

$$R^1(Y^3H)_2 \qquad IV$$

wherein $R^1$ and $Y^1$ are as defined hereinabove, X is chlorine or bromine, and each $Y^3$ is independently sulfur when the corresponding $R^1$ is aliphatic or alicyclic and oxygen or sulfur when the corresponding $R^1$ is aromatic. (The compound of formula III or mixture thereof with that of formula IV is frequently referred to hereinafter as "bishaloformate composition" or "bischloroformate composition".) The condensation reaction typically takes place interfacially when a solution of said compound in a substantially non-polar organic liquid is contacted with a tertiary amine from a specific class and an aqueous alkali metal hydroxide solution.

In addition to compounds of formula III and, optionally, formula IV, the bishaloformate composition may also contain other compounds, including oligomers of the formula:

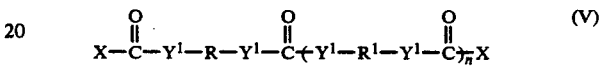

wherein $R^1$, $Y^1$ and X are as previously defined and n is a small number, typically about 1–4.

While the X values in formula III may be chlorine or bromine, the bischloroformates, in which X is chlorine, are most readily available and their use is therefore preferred. (Frequent reference to bischloroformates will be made hereinafter, but it should be understood that other bishaloformates may be substituted therefor as appropriate.) Suitable bis(active hydrogen) compounds of formula IV include diols and thiol analogs thereof having divalent radicals of formula II which are different from the corresponding divalent radicals in the compound of formula III, as well as other dihydroxyaromatic compounds and thiol analogs thereof. When such bis(active hydrogen) compounds are present, they generally comprise up to about 50%, most often up to about 20% and preferably up to about 10%, of the bischloroformate mixture. Most preferably, however, said mixture consists essentially of bischloroformates. Any cyclic oligomers containing divalent aliphatic radicals flanked by two oxygen atoms are prepared by using a mixture of compounds of formulas III and IV. Additional information concerning bischloroformates is set forth in Brunelle et al., U.S. Pat. No. 4,740,583, which is incorporated herein by reference.

The tertiary amines useful in the oligomer formation reaction ("tertiary" in this context denoting the absence of N—H bonds) generally comprise those which are oleophilic; i.e., which are soluble in and highly active in organic media, especially those used in the oligomer preparation method, and in particular those which are useful for the formation of polycarbonates. Reference is made, for example, to the tertiary amines disclosed in the aforementioned U.S. Pat. No. 4,217,438 and in U.S. Pat. No. 4,368,315, the disclosure of which is also incorporated by reference herein. They include aliphatic amines such as triethylamine, tri-n-propylamine, diethyl-n-propylamine and tri-n-butylamine and highly nucleophilic heterocyclic amines such as 4-dimethylaminopyridine (which, for the purposes of this invention, contains only one active amine group). The preferred amines are those which dissolve preferentially in the organic phase of the reaction system; that is, for which the organic-aqueous partition coefficient is greater than 1. This is true because intimate contact between the amine and bischloroformate composition is essential for the formation of the cyclic oligomer mixture. For the most part, such amines contain at least about 6 and preferably about 6–14 carbon atoms.

The most useful amines are trialkylamines containing no branching on the carbon atoms in the 1- and 2-positions. Especially preferred are tri-n-alkylamines in which the alkyl groups contain up to about 4 carbon atoms. Triethylamine is most preferred by reason of its particular availability, lost cost, and effectiveness in the preparation of products containing low percentages of linear oligomers and high polymers.

Also employed in the oligomer formation reaction is an aqueous alkali metal hydroxide solution. It is most often lithium, sodium or potassium hydroxide, with sodium hydroxide being preferred because of its availability and relatively low cost. The concentration of said solution is about 0.2–10M and preferably no higher than about 3M.

A fourth component in cyclic oligomer preparation method is a substantially non-polar organic liquid which forms a two-phase system with water. The identity of the liquid is not critical, provided it possesses the stated properties. Illustrative liquids are aromatic hydrocarbons such as toluene and xylene; substituted aromatic hydrocarbons such as chlorobenzene, o-dichlorobenzene and nitrobenzene; chlorinated aliphatic hydrocarbons such as chloroform and methylene chloride; and mixtures of the foregoing with ethers such as tetrahydrofuran.

To prepare the cyclic oligomer mixture according to the above-described method, in the first step the reagents and components are placed in contact under conditions wherein the bischloroformate compositions is present in high dilution, or equivalent conditions. Actual high dilution conditions, requiring a large proportion or organic liquid, may be employed but are usually not preferred for cost and convenience reasons. Instead, simulated high dilution conditions known to those skilled in the art may be employed. For example, in one embodiment of the method the bischloroformate composition or a mixture thereof with the amine is added gradually to a mixture of the other materials. It is within the scope of this embodiment to incorporate the amine in the mixture to which the bischloroformate is added, or to add it gradually, either in admixture therewith or separately. Continuous or incremental addition of amine is frequently preferred, whereupon the cyclic oligomer mixture is obtained in relatively pure form and in high yield.

Although addition of bischloroformate composition neat (i.e., without solvents) is within the scope of this embodiment, it is frequently inconvenient because many bischloroformates are solids. Therefore, it is preferably added as a solution in a portion of the organic liquid, especially when it consists essentially of bischloroformate. The proportion of organic liquid used for this purpose is not critical; about 25–75% by weight, and especially about 40–60%, is preferred.

The reaction temperature is generally in the range of about 0°–50° C. It is most often about 0°–40° C. and preferably 20°–40° C.

For maximization of the yield and purity of cyclic oligomers as opposed to polymer and insoluble and/or intractable by-products, it is preferred to use not more than about 0.7 mole of bischloroformate composition (calculated as bisphenol bischloroformate) per liter of organic liquid present in the reaction system, including any liquid used to dissolve said composition. Preferably, about 0.003–0.6 mole thereof is used when it consists entirely of bischloroformate, and no more than about 0.5 mole is used when it is a mixture of compounds of formulas III and IV. It should be noted that this is not a molar concentration in the organic liquid when the bischloroformate composition is added gradually, since said composition is consumed as it is added to the reaction system.

The molar proportions of the reagents constitute another important feature for yield and purity maximization. The preferred molar ratio of amine to bischloroformate composition (calculated as bisphenol bischloroformate) is about 0.1–0:1 and most often about 0.2–0.6:1. The preferred molar ratio of alkali metal hydroxide to said composition is about 1.5–3:1 and most often about 2–3:1.

A second step of cyclic oligomer preparation method is the separation of the oligomer mixture from at least a portion of the polymer and insoluble material present. When other reagents are added to the alkali metal hydroxide solution and the preferred conditions and material proportions are otherwise employed, the cyclic oligomer mixture (obtained as a solution in the organic liquid) typically contains less than 30% by weight and frequently less than about 20% of polymer and insoluble material. When all of the preferred conditions are employed, the product may contain 10% or even less of such material. Depending on the intended use of the cyclic oligomer mixture, the separation step may then be unnecessary.

Therefore, a highly preferred method for preparing cyclic oligomer mixtures comprises the single step of conducting the reaction using at least one aliphatic or heterocyclic tertiary amine which, under the reaction conditions, dissolves preferentially in the organic phase of the reaction system, and gradually adding all the reagents simultaneously to a substantially non-polar organic liquid or a mixture of said liquid with water, said liquid or mixture being maintained at a temperature in the range of about 0°–50° C.; the amount of bischloroformate composition used being up to about 0.7 mole for each liter of said organic liquid present in the reaction system, and the molar proportions of amine and alkali metal hydroxide to bischloroformate composition being approximately 0.2–0:1 and 2–3:1, respectively; and recovering the cyclic oligomer thus formed.

As in the embodiment previously described, another portion of said liquid may serve as a solvent for the bischloroformate composition. Addition of each reagent is preferably continuous, but may be incremental for any or all of said reagents.

It ordinarily takes only about 25–30 minutes to complete cyclic oligomer preparation by the foregoing method, and the cyclic oligomer yield may be 85–90% or more. The crude product usually also contains only minor amounts of high molecular weight linear polycarbonates as by-products. By contrast, use of a less preferred embodiment may, depending on reaction scale, require an addition period as long as 8–10 hours and the crude product may contain substantial proportions of linear by-products with molecular weights of about 4,000–10,000, which, if not removed, may interfere with subsequent polymerization of the cyclic oligomers by acting as chain transfer agents.

It is believed that the advantageous results obtained by employing the preferred embodiment are a result of the relatively low pH of the reaction mixture, typically about 9–10. When bischloroformate composition (and optionally amine) is added to alkali metal hydroxide, on the other hand, the initial pH is on the order of 14.

When the polymer separation step is necessary, the unwanted impurities may be removed in the necessary amounts by conventional operations such as combining the solution with a non-solvent for said impurities. Illustrative non-solvents include ketones such as acetone and methyl isobutyl ketone and esters such as methyl acetate and ethyl acetate. Acetone is a particularly preferred non-solvent.

Recovery of the cyclic oligomers normally means merely separating the same from diluent (by known methods such as vacuum evaporation) and, optionally, from high polymer and other impurities. As previously suggested, the degree of sophistication of recovery will depend on such variables as the intended end use of the product.

While the foregoing methods of making cyclic oligomers are set forth, the cyclic oligomers may be made by any suitable method.

Bisphenol A type and Bisphenol A/Hydroquinone type cyclic oligomers are preferred.

The materials used as fiber strands according to this invention can be any material found suitable to withstand the rigors of the pultrusion process and to provide reinforcement of the pultruded composite. Fibrous strands of glass, carbon, aramid, and hybrid strands involving more than one type of fiber can be used. Presently, strands of glass or carbon fiber are preferred since these are the most easily obtained commercially.

Most preferably the strands are glass rovings which are yarns of glass fibers which are preferably slightly twisted long glass fibers.

FIG. 1 illustrates the pultrusion apparatus 10 of the present invention. Spools 12 of slightly twisted glass fiber yarn strands 14 are held in a spool bank 16. The spool bank may contain one or many spools 12, for example thirty spools (five by six in arrangement). Strands 14 are pulled from the spools 12 through holes in strand guide 18 (See, FIG. 5) which guides the strands 14 such that they do not tangle and are distributed across a portion of the width of horizontal cross bar 20. The strands 14 are pulled over the bar 20 and into the catalyst bath 22, under horizontal submerged bar 24, and out of the catalyst bath 22. Catalyst bath 22 contains a catalyst solution 26 which is preferably a suitable catalyst dissolved in a suitable liquid carrier, preferably water. Suitable catalysts are those that will enhance the reaction rate of the cyclic oligomers to high molecular weight polymer resin. The preferred cyclic oligomers are cyclic polycarbonate oligomers, however other cyclic materials which have low melt viscosities and which can be polymerized are also suitable.

The polycarbonate formation catalysts which can be used in the resin formation method of this invention include various bases and Lewis acids. It is known that basic catalysts may be used to prepare polycarbonates by the interfacial method, as well as by transesterification and from cyclic oligomers. Reference is made to the aforementioned U.S. Pat. Nos. 3,155,683; 3,274,214; 4,217,438; 4,368,315; and 4,605,731; which are incorporated herein by reference. Such catalysts may also be used to polymerize the cyclic oligomer mixtures. Examples thereof are lithium 2,2,2-trifluoroethoxide, n-butyllithium and tetramethylammonium hydroxide. Also useful are various weakly basic salts such as sodium benzoate and lithium stearate.

Lewis acids useful as polycarbonate formation catalysts include dioctyltin oxide, triethanolaminetitanium isopropoxide, tetra(2-ethylhexyl) titanate and polyvalent metal (especially titanium and aluminum) chelates such as bisisopropoxytitanium bisacetylacetonate (commercially available under the tradename "Tyzor AA") and the bisisopropoxyaluminum salt of ethyl acetoacetate.

Among the preferred catalysts are lithium stearate, bisisopropoxytitanium bisacetylacetonate and lithium salicylate.

When strands 14 are pulled through the solution 26, they become coated with the solution 26. Once the strands 14 leave the bath 22, it is desirous to remove excess catalyst solution from the strands 14 and to dry the strands 14 to remove any water from them prior to contact with the cyclic oligomers.

The strands 14, upon exiting the bath 22, are then pulled between narrowly spaced parallel bars 28, 29 which squeeze excess solution from the strands. The strands are then pulled through a dryer 30 which blows hot dry air over the strands 14 which evaporates off the carrier solution from the strands 14 leaving a thin coating of dry catalyst on the strands 14. Conventional hot air blowers are suitable as drying components for the dryer 30.

The dried fibers 14 having catalyst thereon are then pulled into a horizontally elongated hollow die 32.

A vertical cross section of the die 32 as shown in FIG. 2.

The die 32 has an upstream first segment 34 integrally attached to a midstream second segment 36 which is integrally attached to a midstream third segment 38 which is integrally attached to a final downstream fourth segment 39. A hollow passage 40 runs horizontally along the length of the die 32 through the segments 34, 36, 38 and 39. The passage 40 is defined by a top wall 42, a bottom wall 44 and two horizontal spaced apart vertical side walls 46, 48 which span the distance between the top wall 42 and bottom wall 44. The passage 40 has an upstream entry port 50 and a downstream exit port 51.

The strands 14 are pulled through the first segment 34 wherein they are heated to a temperature above the melt temperature of the cyclic oligomers in order to prevent solidification of the oligomers upon contact with the strands 14. A heating element 52 adjacent first segment 34 transfers heat to first segment 34 thereby heating the fiber strands 14 to a temperature above the melt temperature of the cyclic oligomers.

The strands 14 are then pulled into the second segment 36 of die 32. The passage 40 has a substantially constant width between the pair of horizontally spaced apart sidewalls 46, 48 throughout its length. The top wall 42 is substantially horizontal and planer along its length except for its portion in section 36. In the first segment 34 the bottom wall 44 is substantially parallel with top wall 42. The second segment 36 has an oligomer entry orifice 54 which is in top wall 42 and which is in communication with an extruder 56 (or other suitable means for melting and pumping the cyclic oligomer) which extrudes molten cyclic oligomer into the upstream end of second segment 36. Directly opposite from orifice 54, the portion 58 of bottom wall 44 in second segment 36 is recessed beneath the portion 60 of bottom wall 44 of first segment 34 providing a vertical drop off ledge 62 between the two. The top wall portion 61 in segment 36 at the upstream end of 36 is recessed from the portion 59 of top wall 42 in segment 34 so as to provide a rising ledge 57 therebetween. Portions 60 and 61 are substantially symmetrical and are further apart from each other at the upstream end of segment 36 than at the downstream end of segment 36, causing passage 40 in segment 36 to taper down in height from the upstream end thereof to the downstream end thereof. The passage 40 in the upstream end of segment 36 is substantially larger in cross sectional area than it is in segment 34 due to the top and bottom walls 42, 44 being recessed in segment 36. Bottom wall 44 inclines gradually upward downstream towards top wall 42 until the second segment 36 meets the third segment 38 of die 32. In second segment 36, the top wall 42 declines gradually downward downstream towards bottom wall 44 until the second segment 36 meets third segment 38 of die 32. Passage 40 in third segment 38 is substantially uniform in vertical cross section throughout the length of segment 38. Passage 40 in third segment 38 is substantially smaller in vertical cross sectional area than the most of the passage 40 in second segment 36. Passage 40 is preferably rectangular in vertical cross section throughout its length if composites having a rectangular cross section are to be made.

The catalyst carrying strands 14 are pulled through entry port 50, into passage 40, through the section of passage 40 in first segment 34, and into the enlarged upstream section of passage 40 in second segment 36. As the strands 14 are pulled into the section of passage 40 in second segment 36, they encounter molten cyclic oligomer which in part because of its low melt viscosity is able to effectively wet out and impregnate the strands whereas high melt viscosity high molecular weight polymer would have too high of a viscosity to effectively wet out and impregnate the strands 14 and their individual fibers. The enlarged section of passage 40 in the upstream part of second segment 36 permits a pool of molten oligomer to form around the catalyst carrying strands 14. As the strands 14 and molten oligomers move downstream within segment 36, the passage 40 narrows in height causing the strands 14 and oligomers to be compressed together under substantial pressure wherein the oligomers and catalyst intermix. Although applying the catalyst to the strands 14 is the preferred method of contacting the catalyst and cyclic oligomers, other methods may also prove suitable, for example, it may be possible to carry the catalyst in with the molten oligomers. The strands 14 and oligomers then move into the section of passage 40 in third segment 38. Second segment 36 of die 32 has a heating element 64 adjacent thereto which heats the oligomers and strands to a temperature above the melt temperature of the oligomers and final polymer to facilitate wetting out of the strands with oligomers. Third segment 38 of die 32 has a heating element 65 adjacent thereto which heats the segment 38 to a temperature above the melt temperature of the oligomer and final polymer and sufficiently high to promote rapid polymerization of the catalyzed oligomers to high molecular weight polymer. The resin and strands then move into and through a fourth segment 39 of die 32 wherein the resin and strands are under pressure and wherein the resin and strands are brought to a temperature below the glass transition temperature of the resin. A heating element 66 is located adjacent the fourth segment 39 and maintains the temperature of the resin sufficiently high to prevent the polymer from sticking to the die. In the fourth segment 39, the thermoplastic resin is preferably allowed to cool to a temperature below the glass transition temperature of the resin to provide a rigid polymeric matrix around the strands 14 thereby providing a final article 68 in which the matrix is sufficiently solidified to prevent the strands and their fibers from lofting upon exiting from the exit port 51 of the die. Failure to sufficiently cool the article prior to its exit from the die 32 can result in lofting which can undesirably result in a less dense and less rigid article having a rough surface.

The strands and rigid polymeric matrix are then pulled from the die 32 through exit port 51. A pulling machine 70 has a pair of vertically spaced apart belts (not shown) which forcibly engage opposite sides of the composite article 68 and are power driven by a source (not shown) to pull the article 68 from the die exit port 51. A cutting device 72 may optionally be employed to cut the article 68 into pieces of desired length. The configuration of the vertical cross section of the die 32 at the exit port 72 defines the shape of the final article. The resulting article can be in the form of a rod, tape, sheet, T section, I section, or other geometrically constant cross sectionally shaped article. Preferably the vertical cross section of the passage 40 and exit port 51 is rectangular resulting in composite articles 68 having rectangular vertical cross sections.

Thus, the strands 14 of fiber pulled from spools 16 and coated with an aqueous catalyst solution 26 in bath 22, dried by dryer 30, pulled into the die 32, contacted with molten cyclic oligomers, heated to permit polymerization of the (catalyzed or noncatalyzed) oligomers into high molecular weight thermoplastic resin, and allowed to cool to a temperature below the glass transition temperature of the polymeric thermoplastic resin to produce a thermoplastic composite article having substantially unidirectionally oriented continuous strands in a rigid thermoplastic matrix.

The resultant thermoplastic composites can have from 10% to 90% by weight of continuous unidirectional reinforcing strands based on the total weight of the composite, more preferably from 30% to 80% by weight thereof and most preferably 60% by weight thereof. Preferably the composite has 10% to 90% by weight thermoplastic resin based on the total weight of the composite, more preferably from 20% to 70% by weight thereof, and most preferably about 40% by weight thereof. Preferably the reinforcing strands are roving of slightly twisted glass fibers. Preferably the thermoplastic matrix is an aromatic polycarbonate resin.

The temperature encountered by the oligomer in segment 38 should be such as to promote rapid polymerization of the oligomer to high molecular weight polymer and should be above the melt temperature of the polycarbonate, preferably from about 250° C. to 350° C.

The resin formation reaction is typically effected by merely contacting the cyclic oligomer mixture with the catalyst at temperatures up to 350° C. until polymerization has proceeded to the extent desired. Preferably the cyclic oligomers are solvent free. In general, the amount of catalyst carried on the strands is about 0.001-1.0 mole percent based on the moles of oligomer. The contacting of high melt flow oligomers with the strands 14 prior to polymerization allows for improved levels of wet out and impregnation during pultrusion.

The available options for the cyclic oligomers are numerous because the resins obtained from cyclic oligomer mixtures are "living" polymers. Thus, the use of oligomer mixtures prepared from a single material such as bisphenol A chloroformate affords homopolycarbonates. Random copolycarbonates may be obtained by using oligomers prepared from a mixture, or blends of two or more different oligomer mixtures. The preparation of block copolycarbonates may be effected, for example, by reacting a bisphenol A cyclic oligomer mixture with a cyclic oligomer mixture derived from another bisphenol such as 2,2-bis(4-hydroxyphenyl-1,1-dichloroethylene and controlling the time of addition. If desired, one or both mixtures may be prepolymerized before combining them. Another possibility is the formation of a cyclic oligomer mixture containing about 50 mole percent of (for example) bisphenol A units and about 50% of sterically hindered units which will not condense with themselves, illustrated by 2,2-bis(4-hydroxy-3,5-dimethylphenyl)propane. The resulting cyclic mixtures contain alternating bisphenol A and sterically hindered units, and may be converted to alternating copolycarbonates.

The conditions of the polymerization reaction may be varied to produce resinous compositions of various molecular weights and molecular weight distributions (i.e., Mw/Mn ratios), including resins having properties substantially the same as those of commercial bisphenol A polycarbonates. Molecular weight can be controlled by varying the amount of catalyst, with a decrease in said amount generally resulting in an increase in molecular weight, or by employing known chain transfer or endcapping agents, of which diphenyl carbonate is an example, typically in amounts up to about 2.5 mole percent based on oligomer mixture. It is also possible to produce resins having very low molecular weight distributions (i.e., Mw/Mn ratios), frequently approaching or lower than 2.0.

The oligomers may be reacted to produce polymers of very high molecular weights, particularly when no endcapping agents are used. Values above 250,000 are attainable.

The temperature in fourth segment 39 should be such as to keep the polycarbonate resin from sticking to the walls of the die and should be below the glass transition temperature of the polycarbonate resin to prevent the strands from lofting upon exiting from the exit port 51.

In addition to polycarbonate resin, cyclic oligomers exist for other resins. See U.S. Pat. No. 4,829,144 for cyclic polyester oligomers, and Guggenheim, et. al., U.S. Pat. No. 4,880,899 for cyclic polyphenylene ether-polycarbonate oligomers, all of which are incorporated herein by reference. An important characteristic of the cyclic oligomer is that it be a precursor for a thermoplastic resin. Preferably the cyclic oligomer has a melt viscosity of less than 1000 poise at 200° C. A small amount of lubricant such as 3% polyethylene by weight may be added to the cyclic oligomers to prevent the cyclic oligomers from adhering to the die surface in the fourth segment.

EXAMPLES

The following examples illustrate the present invention but are not meant to limit the scope thereof.

EXAMPLE 1

Cyclic Bisphenol A Type Polycarbonate Oligomer

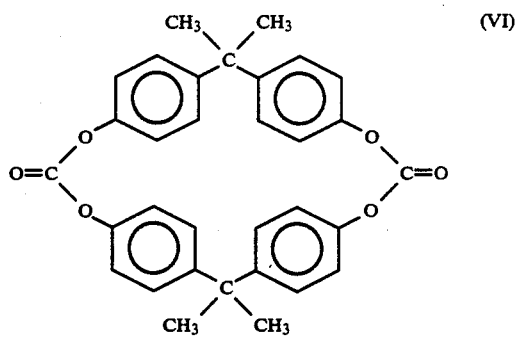

(VI)

EXAMPLE 2

Aromatic Polycarbonate Resin Derived from Bisphenol A and Phosgene.

TABLE 1

| Temp (°C.) | Example 1 Melt Viscosity (POISE) Zero Shear | Example 2 Melt Viscosity (POISE) Zero Shear |
| --- | --- | --- |
| 200 | 220 | $2.0 \times 10^6$ |
| 225 | 30 | $2.0 \times 10^5$ |
| 250 | 6 | $4.3 \times 10^4$ |
| 275 | 3 | $1.4 \times 10^4$ |
| 300 | 1 | $6.3 \times 10^3$ |

Examples 1 and 2 illustrate the substantially lower melt viscosities of the oligomers compared to the high molecular weight polymer. Melt viscosities were measured by oscillatory rheometer.

EXAMPLES 3 AND 4

Composites were made by pultrusion using the cyclic polycarbonate oligomer of Example 1 and the properties of the pultruded composite are set out in Table 2. The composites exhibited good wet out and impregnation of the fibers by the resin.

TABLE 2

| Property | Example 3 | Example 4 |
| --- | --- | --- |
| Wt. % E-glass | 60 | 60 |
| Flexural, Psi | | |
| Strength $\times 10^3$ | 91 | 93 |
| Modulus $\times 10^6$ | 4.6 | 4.7 |

The pultruded composite of Example 3 and 4 resultant aromatic polycarbonate resin matrix having a weight average molecular weight of 36,400 resulting from the polymerized oligomer of Example 1. The pultruded composite of Example 4 had a resultant aromatic polycarbonate resin matrix having a weight average molecular weight of 51,500 resulting from the polymerized oligomer of Example 1. The purity of oligomer can affect the resultant final molecular weight of the polymer.

CYCLICS COMPOSITES PULTRUSION PROCESS DEVELOPMENT
POLYMERIZATION PERFORMANCE
Rod-⅛" Diameter
60% Linear Glass-LiSal Catalyst
Line Speed-6 ipm (5 hour run)
Extruder Temperature Gradient-At Cyclic Input Of Extruder 230, 250, 255, 260° C.
at Cyclic Exit From Extruder And At Entrance Of Die

| Ex. | Material | Die | % Conversion | Peak Mw | Mw |
|---|---|---|---|---|---|
| 5 | Cyclics of Example 1 with 3% Polyethylene | 273[a]/291[b]/165° C.[c] | 96 | 28,300 | 32,600 |
| 6 | Cyclics of Example 1 with 3% Polyethylene (Dried) | 271[a]/291[b]/173° C.[c] | 95 | 29,300 | 36,400 |
| 7 | Cyclics of Example 1 with 3% Polyethylene (Dried) | 274[a]/294[b]/170° C.[c] | 94 | 40,600 | 51,500 |

[a]second segment
[b]third segment
[c]fourth segment

Examples 5 to 7 are pultruded composites made using the cyclic of example 1. Note that during the pultrusion process the cyclics were effectively converted to high molecular weight polycarbonate resulting in a composite having substantially unidirectionally oriented glass strands in a high molecular weight thermoplastic matrix. The equipment employed was set up as in FIG. 1 so that catalyst carrying glass strands were introduced into the die and contacted with the cyclics. The cyclics impregnate and surround the strands and polymerize to form a high molecular weight polycarbonate matrix around the strands resulting in the desired composite article.

What is claimed:

1. A pultrusion process for making reinforced thermoplastic composites, said process comprising:
   (a) pulling a plurality of continuous fibrous strands into an upstream portion of an elongated die;
   (b) forcing molten cyclic aromatic polycarbonate oligomers into the upstream portion of said die into contact with said strands such that a pool of molten oligomers forms around the strands;
   (c) moving said contacted strands and oligomers downstream into a reaction zone of the die wherein said oligomers are heated to a reaction temperature in the presence of a catalyst to form a high molecular weight aromatic polycarbonate resin matrix around said strands;
   (d) moving said strands and resin matrix further downstream into a cooling zone of the die wherein said resin is allowed to cool to a temperature below its glass transition temperature to provide a rigid polymeric matrix around the strands;
   (e) pulling the strands and rigid polymeric matrix from the die through an exit portion in the die to form a final article of the strands and polymeric matrix, wherein the configuration of the vertical cross section of the die at the exit port defines the shape of the final article.

2. The process of claim 1 wherein said catalyst is lithium salicylate.

3. The process of claim 1 wherein said strand is a yarn of glass fibers.

* * * * *